(12) United States Patent
Kawamata

(10) Patent No.: US 6,338,041 B1
(45) Date of Patent: Jan. 8, 2002

(54) PASSENGER MANAGEMENT SYSTEM

(75) Inventor: Hiroshi Kawamata, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/182,564

(22) Filed: Oct. 29, 1998

(30) Foreign Application Priority Data

Jun. 19, 1998 (JP) .......................... 10-173138

(51) Int. Cl.[7] .......................... G06K 17/60; G08B 26/00
(52) U.S. Cl. .......................... 705/5; 340/505
(58) Field of Search .......................... 705/5; 340/505

(56) References Cited

U.S. PATENT DOCUMENTS

| | | | | |
|---|---|---|---|---|
| 4,984,156 A | * | 1/1991 | Mekata | 364/407 |
| 5,253,165 A | * | 10/1993 | Leiseca | 364/407 |
| 5,404,291 A | * | 4/1995 | Kerr | 364/407 |
| 5,412,191 A | * | 5/1995 | Baitz | 235/383 |
| 5,570,283 A | * | 10/1996 | Shoolery | 364/407 |
| 5,634,016 A | * | 5/1997 | Steadham | 395/329 |
| 5,724,520 A | * | 3/1998 | Goheen | 395/205 |
| 5,943,651 A | * | 8/1999 | Oosawa | 705/5 |
| 6,057,756 A | * | 5/2000 | Engellenner | 340/505 |
| 6,094,640 A | * | 7/2000 | Goheen | 705/5 |

FOREIGN PATENT DOCUMENTS

| | | |
|---|---|---|
| JP | 5-173518 | 7/1993 |
| JP | 9-223253 | 8/1997 |
| WO | WO9838600 | * 9/1998 ............ G08B/3/00 |

OTHER PUBLICATIONS

Business Wire Jun. 22, 1998—p6220132—S&P Announces Strategic Enterprise Managment Application.*
Business Week Jun. 2, 1997 p. 130E n3529 "Face–to–Face with the Latest in Airport Security".*
"Face to Face with the Latest in Airport Security"—Business Week—Jun. 2, 1997—Arnst, C.*

* cited by examiner

Primary Examiner—Vincent Millin
Assistant Examiner—Geoffrey Akers
(74) Attorney, Agent, or Firm—Armstrong, Westerman, Hattori, McLeland & Naughton, LLP

(57) ABSTRACT

A passenger management system having a boarding processing system with a plurality of tag readers and speakers connected to an automatic broadcasting unit each located in a plurality of areas into which a premises of an airport is divided. If there is found a remarked boarding card with which the check-in has been completed at a checking counter but boarding has not been confirmed, the tag readers are successively actuated from a gate counter and an area among said plurality of areas in which said remarked boarding card is present is determined based on the signal received by said tag readers. In such a way, remarked boarding cards, namely not-boarded passengers are managed for each area.

17 Claims, 12 Drawing Sheets

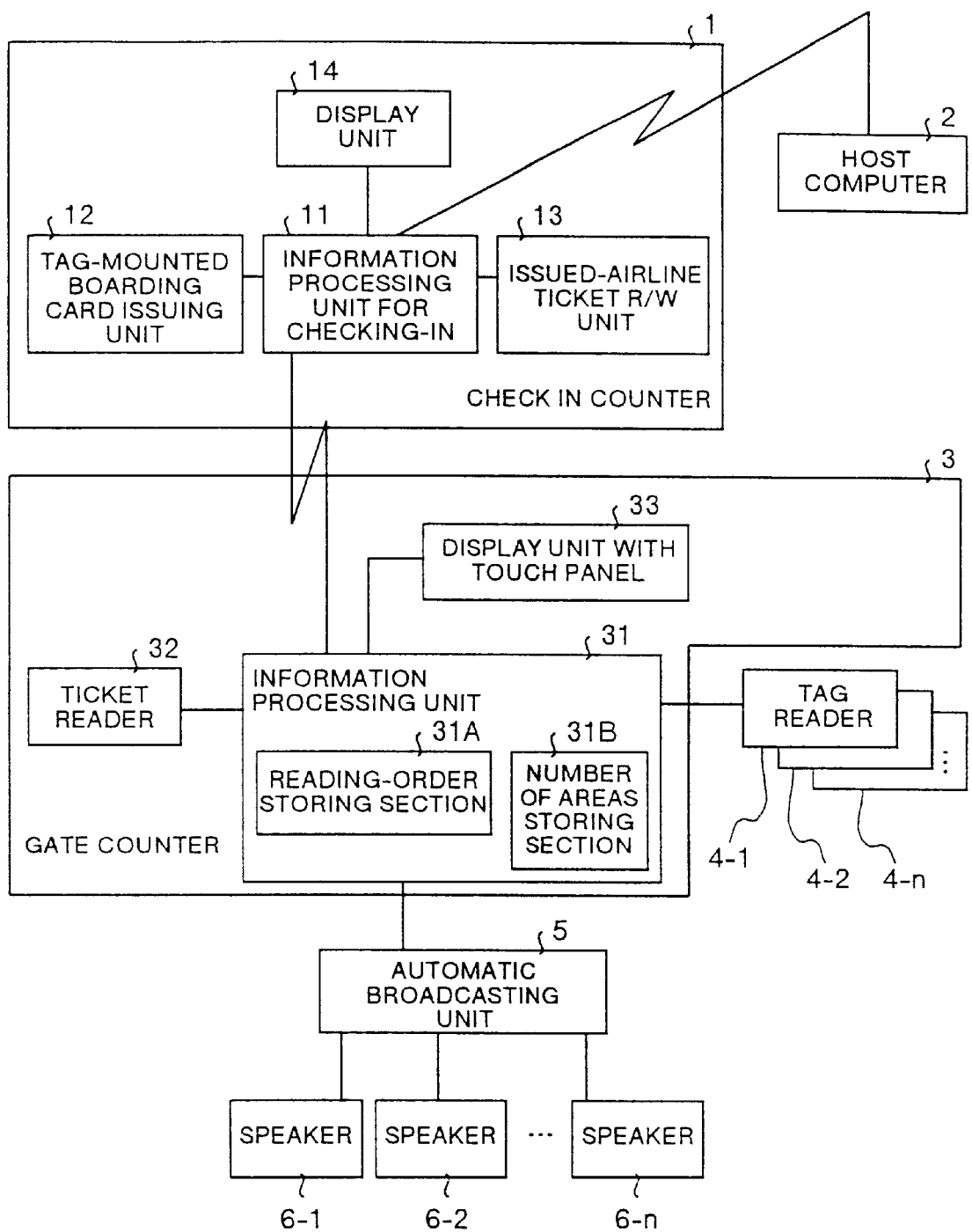

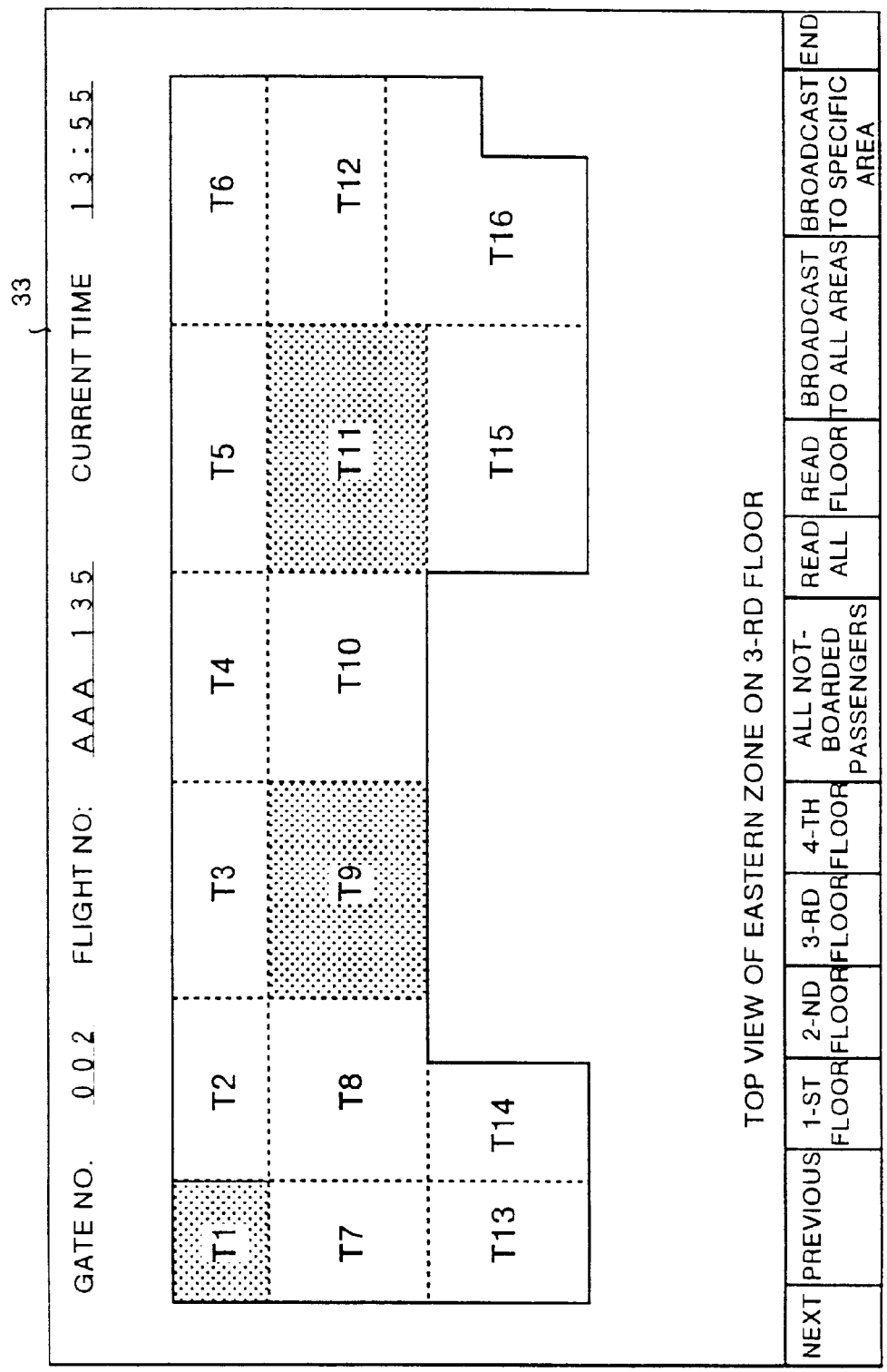

FIG.3

| GATE NO. 0 0 2 | FLIGHT NO: A A A  1 3 5 | CURRENT TIME 1 3 : 5 5 |
|---|---|---|

SELECTED AREA= 3 F / E / T 1 1

| A NUMBER OF PASSENGERS HAVING CHECKED IN | 1 0 PERSONS | A NUMBER OF PASSENGERS HAVING NOT CHECKED IN | 1 5 PERSONS |
|---|---|---|---|
| THIS AIRLINE | 5 PERSONS | THIS AIRLINE | 1 0 PERSONS |
| PASSENGERS FOR THIS FLIGHT | 2 PERSONS | PASSENGERS FOR THIS FLIGHT | 0 PERSONS |
| OTHER AIRLINE | 5 PERSONS | OTHER AIRLINE | 5 PERSONS |

DETAILS FOR NOT-BOARDED PASSENGERS HAVING CHECKED IN
(AAA APPLIED 5 PERSONS / THIS FLIGHT 2 PERSONS)

| | AIRLINE TICKET NO. | PASSENGER'S NAME | | FLIGHT NO. | DESTINATION | DEPARTURE TIME | ON BOARD: YES/NO |
|---|---|---|---|---|---|---|---|
| ① | AJ12058-034 | KAWAMATA/HIROSHI | M | 1 3 5 | SAPPORO | 1 4 : 0 0 | O |
| ② | AJ24322-011 | YAMADA/TARO | M | 2 3 7 | FUKUOKA | 1 4 : 3 0 | X |
| ③ | AJ02283-211 | SATO/HANAKO | F | 1 6 9 | OKINAWA | 1 4 : 1 0 | O |
| ④ | AJ34605-101 | TANAKA/KEN | M | 1 3 5 | SAPPORO | 1 4 : 0 0 | O |
| ⑤ | AJ20824-602 | SUZUKI/YUMIKO | F | 3 2 5 | ITAMI | 1 5 : 0 0 | X |

END OF DATA

| NEXT | PREVIOUS | BROADCAST | ALL NOT-BOARDED | | | END |
|---|---|---|---|---|---|---|

FIG.4

| | AIRLINE TICKET NO. | PASSENGER'S NAME | | FLIGHT NO. | DESTINATION | DEPARTURE TIME | CURRENT POSITION |
|---|---|---|---|---|---|---|---|

GATE NO. 002   FLIGHT NO: AAA 135   CURRENT TIME 13:55

NOT-BOARDED PASSENGERS= 4 PERSONS

DETAILS FOR NOT-BOARDED

| | AIRLINE TICKET NO. | PASSENGER'S NAME | | FLIGHT NO. | DESTINATION | DEPARTURE TIME | CURRENT POSITION |
|---|---|---|---|---|---|---|---|
| ① | AJ12058-034 | KAWAMATA/HIROSHI | M | 135 | SAPPORO | 14:00 | 3F/T11 |
| ② | AJ34605-101 | TANAKA/KEN | M | 135 | SAPPORO | 14:00 | 3F/T11 |
| ③ | AJ20012-332 | AOKI/REIKO | F | 135 | SAPPORO | 14:00 | 3F/T10 |
| ④ | AJ10265-398 | KOBAYASHI/HIROKAZU | M | 135 | SAPPORO | 14:00 | UNKNOWN |

| NEXT | PREVIOUS | BROADCAST | UPDATE TO LATEST INFORMATION | | | END |
|---|---|---|---|---|---|---|

PASSENGER MANAGEMENT SYSTEM

FIELD OF THE INVENTION

The present invention relates to a passenger management system and more particularly, to a passenger management system for managing a position of a passenger in a building of an airport or the like by using a boarding card with a radio function.

BACKGROUND OF THE INVENTION

In the airport, for example, boarding of a passenger is recognized with the passenger management system when the passenger inserts a boarding card through a device for boarding procedure after checking in. If boarding of a passanger can not be confirmed even after a closing time for boarding, then, an announcement is made inside the airport to urge the passenger to board.

However, the present position of the passenger is not known, and the passenger may not always hear the announcement, so that such an announcement is only a one-sided conveying means. For this reason, there is a need of a passenger management system which can surely convey a message to the passenger.

Recently, there has been proposed a technology in which plurality of antennas are distributed in the building of an airport and a position of a passenger is detected from waves transmitted from a boarding card as disclosed, for example, in Japanese Patent Laid-Open Publication No. HEI 9-223253.

In the conventional type of passenger management system of the above Publication, the position of a not-boarded passenger is recognized according to strength of received waves by using the plurality of distributed antennas, so that the accurate strength of the waves may not be detected depending on where the antennas are located in the building, and for this reason it may be difficult to specify the position of the passenger. Especially, when departure time is approching, it is required to find out the not-boarded passenger as quickly as possible, and for this reason, appearance of a passenger management system for quickly finding out a not-boarded passenger is now desired.

Even when the position of the not-boarded passenger is detected in the above system, the announcement made at that position may not reach the passenger if there is a large error in the detected position.

SUMMARY OF THE INVENTION

It is an object of the present invention to provide, in order to solve the problems based on the conventional technology, a passenger management system which can quickly and accurately find out a position of a not-boarded passenger and further appropriately guide the passenger to the airplane.

With the present invention, in a boarding processing system with a plurality of tag readers located in a plurality of areas into which a premises of an airport is divided, if there is found any remarked boarding card with which the check-in has been finished but the boarding has not been confirmed, the tag readers are actuated and an area among the plurality of areas in which the remarked boarding card is present is determined according to the signal received by the tag readers, so that remarked boarding cards for each area can be checked, an with this operation, whereabouts of not-boarded passenger can quickly and accurately be found out independently for each area.

With the present invention, in a boarding processing system, a plurality of areas are discretely displayed on a display unit respectively, so that whereabouts of each not-boarded passenger can easily be recognized.

With the present invention, a switch for discretely displaying each result of determination on the plurality of areas is provided in a display unit, so that any required area can be specified with a switching operation, and with this operation, a status of each not-boarded passenger can be recognized only from the required area.

With the present invention, a switch of a display unit is based on a touch panel, so that a switching operation becomes easy, an with this operation, each not-boarded passenger can quickly be followed.

With the present invention, an information processing unit actuates, when actuating a plurality of tag readers, only a tag reader for the area for which a switch has been operated, so that whereabouts of remarked boarding cardcan be recognized for an arbitrary area, and with this operation, each not-boarded passenger can efficiently be followed.

With the present invention, an information processing unit stores a number of incidences of remarked boarding cards for each of a plurality of areas on a memory, so that the stored data can be managed as data to objectively determine in which area not-boarded passengers tend to linger about.

With the present invention, an information processing unit actuates, when actuating tag readers, the tag readers in a descending order from a tag reader having the highest-incidence area according to a number of incidences stored on a memory, so that the efficiency of finding out each not-boarded passenger at an early stage can be improved.

With the present invention, an information processing unit provides controls, when actuating a broadcasting unit, for broadcasting targeted only to the area for which a switch has been operated, so that broadcasting discretely to each area can be realized, and with this operation, it is possible to solve such inconvenience that the broadcasting does not reach or does not easily reach depending on places.

With the present invention, an information processing unit makes, when actuating a broadcasting unit, the unit broadcast to the areas in a descending order from the highest-incidence area according to the number of incidences stored on the memory, so that the message-transfer efficiency of finding out each not-boarded passenger at an early stage can be improved.

With the present invention, an information processing unit prepares a list of not-boarded passengers who have remarked boarding cards with which the check-in has been finished in a check-in processing system but the boarding has not been confirmed, and finds out a current position of any not-boarded passenger on the list for each area according to a result of determination by each tag reader, so that management of whereabouts of each not-boarded passenger can be centralized.

With the present invention, an information processing unit updates a list at prespecified time intervals, so that each not-boarded passenger can be followed, and with this operation, an updated whereabouts of each not-boarded passenger can be stored at any time.

With the present invention, in an boarding processing system with a plurality of tag readers located in a plurality of areas into which a premises of an airport is divided, the tag readers are actuated if there is found any remarked boarding card which has been issued but with which the boarding has not been confirmed, and an area among the plurality of areas in which the remarked boarding card is present is determined according to the signal received by the tag readers, so that remarked boarding cards can be checked for each area, and with this operation, whereabouts of not-boarded passenger can quickly and accurately be found out independently for each area.

Other objects and features of this invention will become clear from the following description with reference to the accompanying drawings.

BRIEF DESCRIPTION OF THE DRAWINGS

FIG. 1 is a block diagram showing a passenger management system according to Embodiment 1 of the present invention;

FIG. 2 is a view showing a display example of areas according to Embodiment 1;

FIG. 3 is a view showing a display example of a selected area according to Embodiment 1;

FIG. 4 is a view showing a display example of information indicating whereabouts of not-boarded passengers according to Embodiment 1;

DESCRIPTION OF THE PREFERRED EMBODIMENTS

Figure 5:
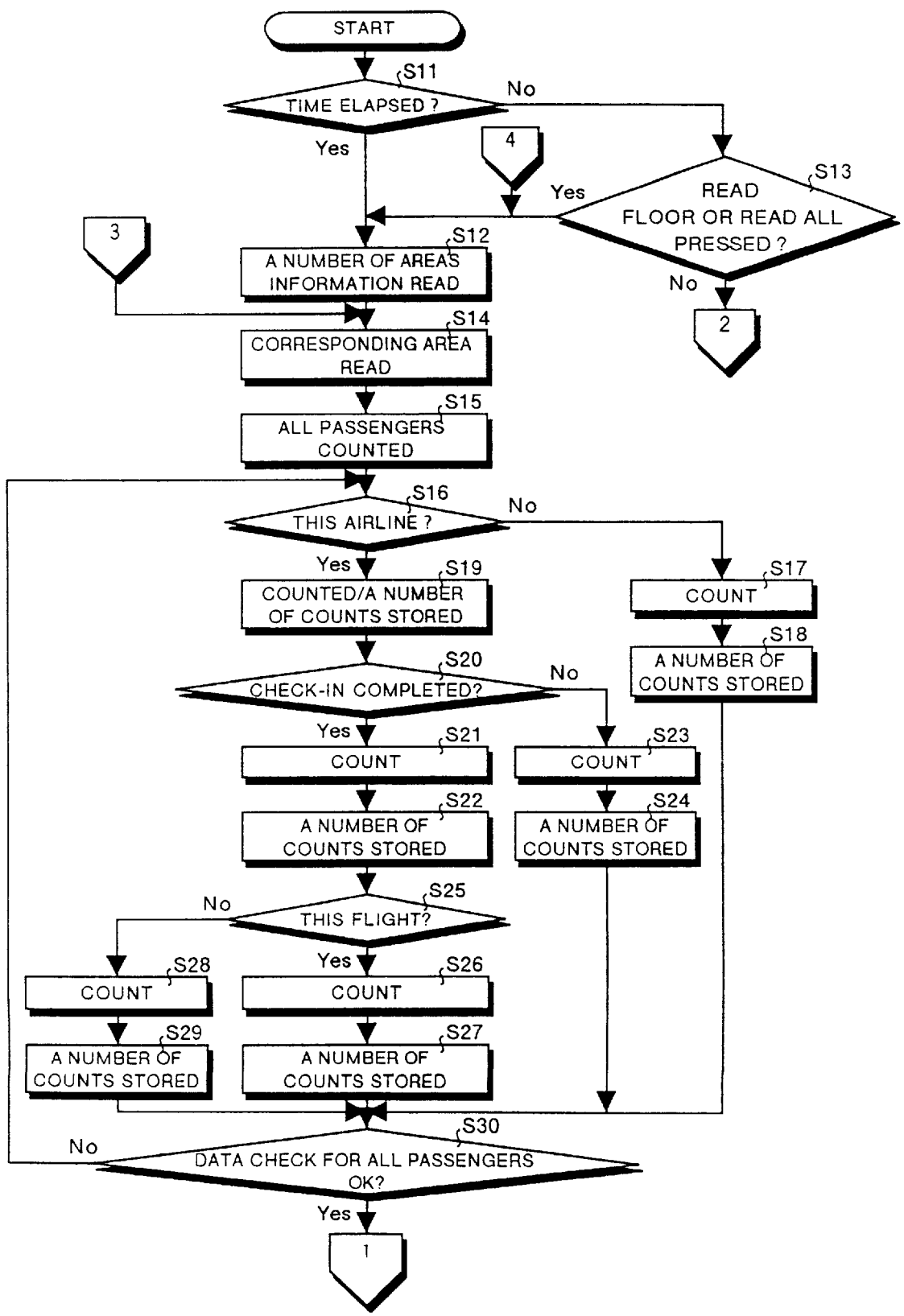
FIG. 5 is a flow chart for explaining an entire operation when all the areas are selected according to Embodiment 1.

Detailed description is made hereinafter for preferred embodiments of a passenger management system according to the present invention with reference to the related drawings.

At first, configuration of the system is described. FIG. 1 is a block diagram showing a passenger management system according to Embodiment 1 of the present invention. This passenger management system comprises, as shown in FIG. 1, a check-in counter 1 for processing a check-in using a boarding card having a tag, a host computer 2 connected to this check-in counter 1 for managing reservation or the like, a gate counter 3 located near a boarding gate for confirming the boarding of each passenger using the boarding card, tag readers 4-1 to 4-n located in areas respectively obtained by dividing inside the building of an airport into preset n-areas, an automatic broadcasting unit 5 for broadcasting boarding information and messages to not-boarded passenger inside the building, and speakers 6-1 to 6-n located in the areas for outputting voice.

The check-in counter 1 comprises an information processing unit for checking-in 11, a tag-mounted boarding card issuing unit 12, an issued-airline ticket R(tag reader)/W (writer) unit 13, and a display unit 14. The information processing unit for checking-in 11 provides controls for entire processing of checking-in. The tag-mounted boarding card issuing unit 12 issues a tag for a boarding card without a tag or issues anew tag-mounted boarding card. Herein, the tag is a device for transmitting waves in response to being read by the tag readers 4-1 to 4-n, and there is recorded therein information such as Check-in: Done/Not-yet, Ticket Number, Name, Sex, Age, Flight Number, Destination, Specified information, Contact Address, and Issuing Company. The issued-airline ticket R/W unit 13 processes an airline ticket previously purchased from a travel agent. The display unit 14 displays thereon information regarding tickets and/or seats and the like.

The gate counter 3 comprises an information processing unit 31, a ticket reader 32, and a display unit with a touch panel 33. The information processing unit 31 provides controls over entire processing related to confirmation of boarding. This information processing unit 31 comprises a reading-order storing section 31A and a number of areas storing section 31B. The reading-order storing section 31A stores therein an order of reading the tag readers 4-1 to 4-n. The number of areas storing section 31B stores therein a number of preset areas. The ticket reader 32 reads a boarding card of a passenger. The display unit with a touch panel 33 displays thereon floor information for each area as well as status of boarding for each flight, and a required screen can be selected by touching the panel.

A display screen is described. FIG. 2 is a view showing an example of display of the areas, FIG. 3 is a view showing an example of a display of a selected area and FIG. 4 is a view showing an example of display of information indicating whereabouts of not-boarded passengers. It is asumed that the airport building has four floors, and each zone on each floor is divided into a preset number of areas. For example, FIG. 2 shows areas in the eastern zone on the third floor. The eastern zone is divided, for example, into 16 areas from T1, T2, ..., T16. In addition to these areas, Gate Number, Flight Number, Current Time and information indicating the corresponding floor (e.g., "Plan view of eastern zone on third floor") appear on the display screen.

The display unit with a touch panel 33 for forming a display screen switches a screen to another screen when touched, so that a switching menu is displayed on the lower side of the screen. Prepared in the menu are icons of "Next" for switching to the next page; "Previous" for returning to the previous page; "1-st floor", "2-nd floor", "3-rd floor" and "4-th floor" for directly jumping to any floor; "All not-boarded passengers" for giving an instruction to find all the not-boardeed passengers who have checked in for the corresponding flight; "Read All" for successively reading information for each tag in all the areas on all the floors; "Read Floor" for successively reading information for each tag in all the areas on a corresponding floor; "Broadcast to All areas" for giving an instruction to broadcast boarding information or so to all the areas on all the floors; "Broadcast to Specified Area" for specifying a required area on a corresponding floor and giving an instruction to broadcast boarding information or so to the specified area; and "End" for giving an instruction to end the operation.

When, for example, the area "T11" is touched on the display screen in FIG. 2, information for passengers having checked in as well as for confirmation as to whether the passengers have been on board or not in the area "T11" is displayed. FIG. 3 shows an example of such a display. Then, the menu on the lower side of the display screen is changed to the menu containg "Next", "Previous", "Broadcast" for instructing broadcast to the corresponding area, "All not-boarded passengers" for displaying all not-boarded passengers on the corresponding floor, and "End".

As main display contents, there are Gate Number, corresponding Flight Number, Current Time, Selected Area, A number of passengers having checked in and a breakdown thereof, A number of passengers not yet checking in and a breakdown thereof, and Details about passengers having checked in but not yet boarding. As for "A number of passengers having checked in and a breakdown thereof", a number of passengers having tickets of the airline under consideration as well as of passengers having tickets of other airlines are displayed, and for the cuncerned airline, a number of passengers for the corresponding flight are also displayed. As for "Details about passengers having checked in but not yet boarding", Passenger's Name, Flight Number, Destination, Departure Time, and On board or Not are displayed each corresponding to Ticket Number. All the information is managed by the information processing unit 31.

When, for example, "All not-boarded passengers" is touched on the display screen in FIG. 3, information for "All not-boarded passengers" is displayed. FIG. 4 shows an example of such a display. Then, the menu on the lower side of the display screen is changed to the menu having "Next", "Previous", "Broadcast" for instructing broadcast to the corresponding area, "Update to latest information" for reading information for each tag to find out once more all not-boarded passengers on the corresponding floor, and "End".

As main display contents, there are Gate Number, corresponding Flight Number, Current Time, A number of not-boarded passengers, and Details about passengers having checked in but not yet boarding. The information for the passengers having checked in but not yet boarded shown in FIG. 4 is obtained as a result of verification between the information having been managed by the information processing unit 31 and information read out anew by the tag readers 4-1 to 4-n. Namely, the information is the latest one for the passengers who have checked in but did not board.

Figure 6:
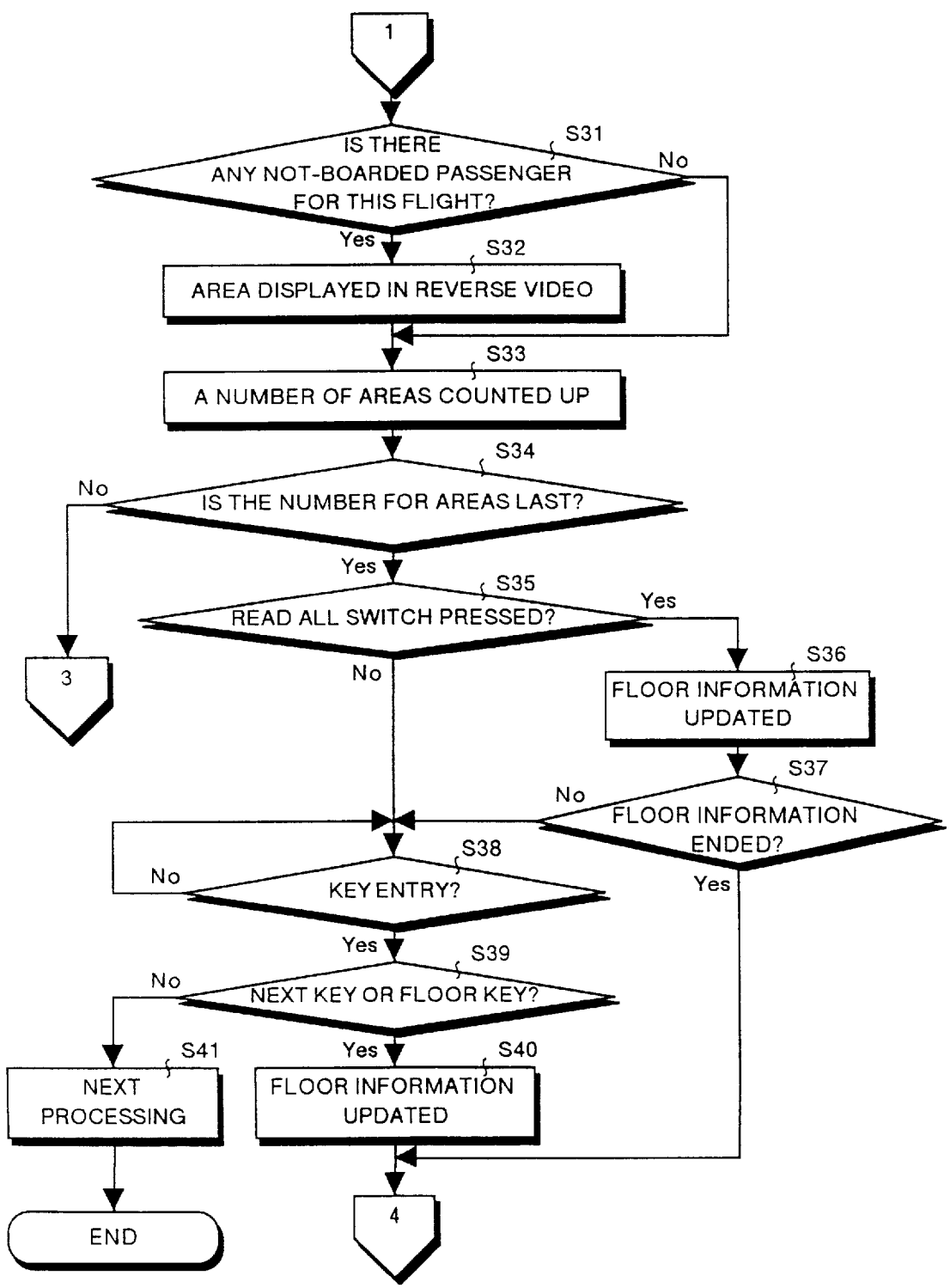
FIG. 6 is a flow chart for explaining the entire operation when all the areas are selected according to Embodiment 1.
Figure 7:
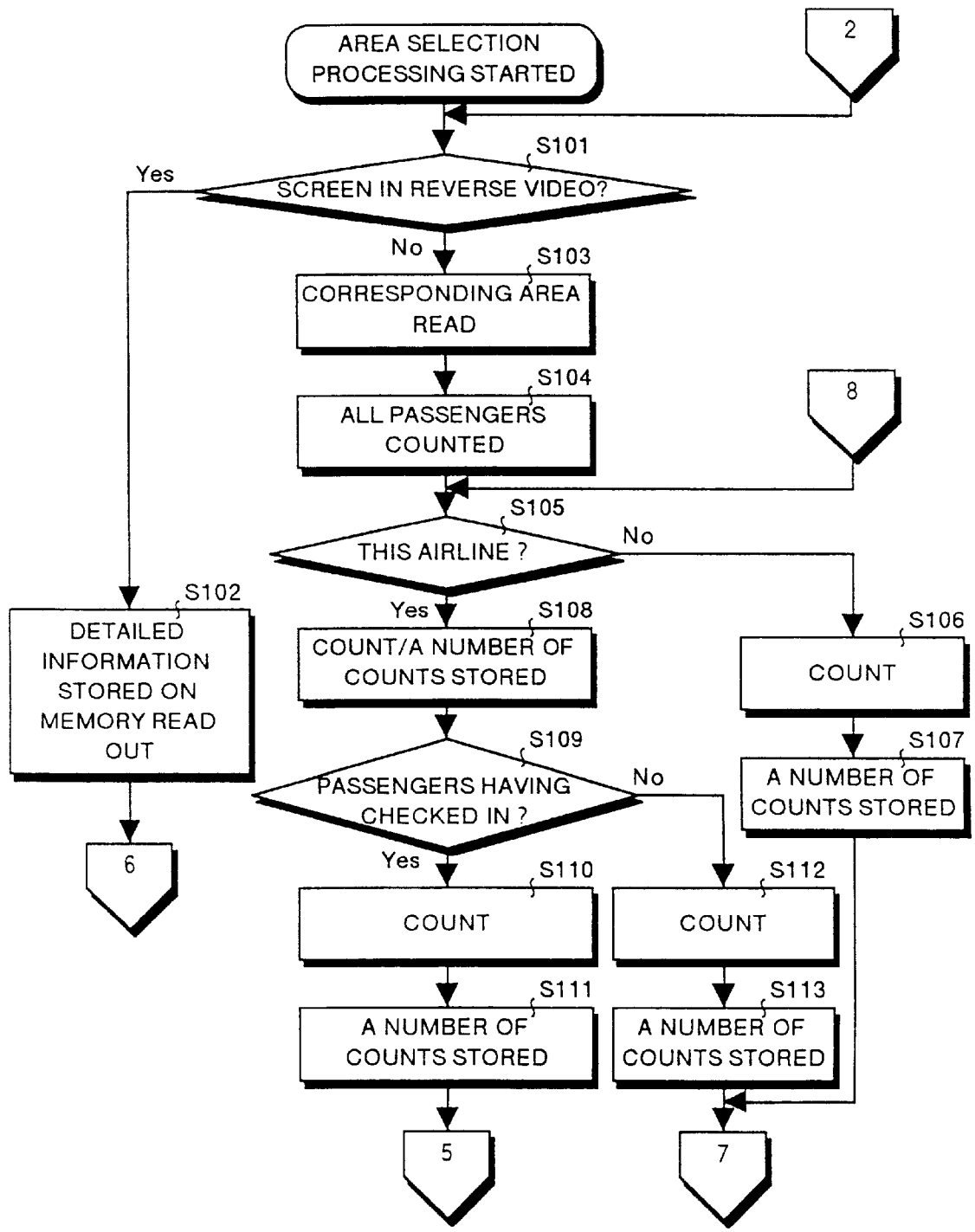
FIG. 7 is a flow chart for explaining an operation when one of the areas is selected according to Embodiment 1.
Figure 8:
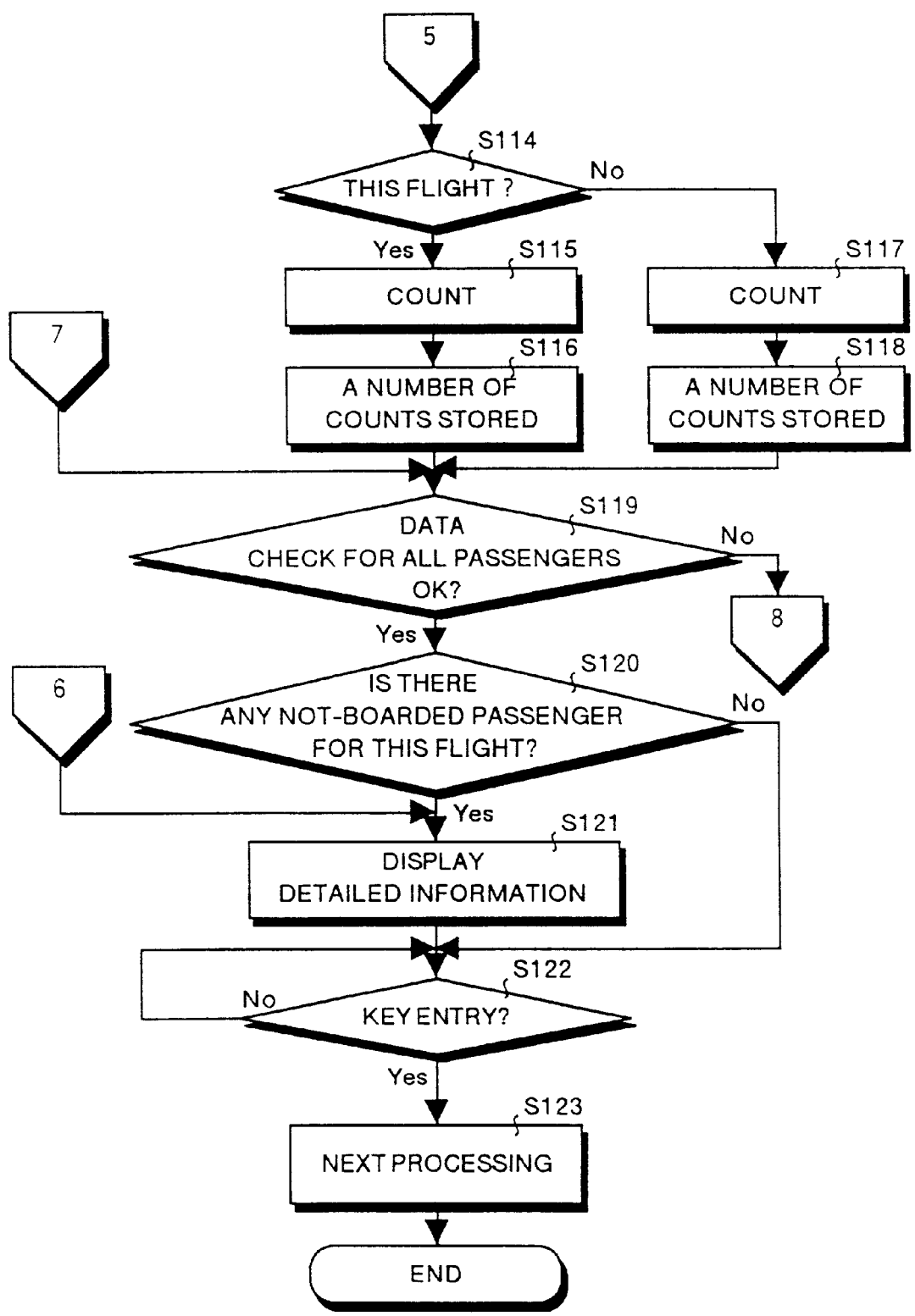
FIG. 8 is a flow chart for explaining the operation when one of the areas is selected according to Embodiment 1.

Next, description is made for the operation of Embodiment 1. FIG. 5 and FIG. 6 are flow charts for explaining an entire operation when all the areas are selected according to Embodiment 1, and FIG. 7 and FIG. 8 are flow charts for explaining an operation when one of the areas is selected. It should be noted that FIG. 2, FIG. 3 and FIG. 4 are referred to for the description below.

A passenger shows a previously issued ticket, namely a boarding card at the check-in counter 1. Information for the airline ticket is read out by the issued-airline ticket R/W unit 13 at the check-in counter 1. The check-in counter 1 can process only the boarding card issued by a corresponding airline. A tag is previously mounted on the ticket, and information indicating that the passenger has checked in is written by the issued-airline ticket R/W unit 13 on the tag after the seat is specified.

It should be noted that a boarding card with hand-written information thereon may be brought in to the check-in counter 1, and in such a case, the information thereon is manually inputted with the information processing unit for checking-in 11, and during the manual operation, the input contents is checked on the display unit 14. After the check, the tag-mounted boarding card issuing unit 12 issues a boarding card with a tag in which information that the check-in has been completed is written.

An information processing unit 31 connecting thereto a display unit with a touch panel 33 is provided to the gate counter 3 provided at the boarding gate, and plan view of each floor in the terminal building is displayed on the display unit with a touch panel under controls by this information processing unit 31. As described above, the plan view of the eastern zone on the third floor is shown in FIG. 2, and a required floor can be specified by touching a key corresponding to that floor, the floor is displayed in its divided state.

The operation of the gate counter 3 starts with the operation of the information processing unit 31. At first, it is checked whether a specified time set by a timer has elapsed or not (step S11), and when it is checked that the time has elapsed, the processing shifts to step S12. The setting of a timer is a mode for executing processing to follow a not-boarded passenger after the specified time has elapsed. The time in the timer isset previously. As one of examples, it is even possible to automatically actuate a timer to follow a not-boarded passenger five minutes before boarding is closed. In this case, not-boarded passengers are automatically checked after a certain time without any help of staff, so that a failure in checking of not-boarded passengers can be prevented. It should be noted that the time at which a timer is actuated can arbitrarily be set in consideration of high efficiency of boarding.

When in step S11 it is decided that the specified time set by a timer has not elapsed, it is recognized in step S13 that a key of either "Read Floor" or "Read All" on the display screen is pressed or not. When it is detected that either one of the keys has been pressed, the processing shifts to step S12 and the same processing as that in the case of timer setting is executed. On the other hand, when it is detected that the keys are not pressed, the processing shifts to step S101 (FIG. 7).

In step S12, at first, information for a number of areas stored in a number of areas storing section 31B is read out, and the number of areas is confirmed. The example in FIG. 2 shows 16 areas. In step S14, at first, the tag reader 4-1 located in the first area is actuated according to the information for the number of areas. The first area is the area "T1" in the example in FIG. 2. Information can be read from a tag-mounted boarding card held by a not-boarded passenger in the first area. Then, a number of all the passengers holding tag-mounted boarding cards is counted for the first area (step S15).

The position of the passengers holding the tickets of this airline is checked one by one from the tag information collected as described above (step S16). As a result, when a position of first passenger can not be recognized, the processing shifts to step S17, and the passenger is regarded as one of the passengers holding tickets of other airline to be counted by one, and the number of counts is stored on the memory in step S18. Then, the processing shifts to step S30.

On the other hand, when the position of first passenger can be recognized is in step S16, the passenger is added to a number of passengers holding the tickets of this airline and the number of counts is stored on the memory in the information processing unit 31 (step S19). Further, determination is made as to whether the passenger has checked in or not (step S20), and if it is determined that the passenger has checked in, he (she) is added to the number of passengers who have checked in (step S21), and the number of counts is stored on the memory (step S22). Then, the processing shifts to step S25. When it can not be recognized in step S20 that the passenger has checked in, he (she) is added to the number of passengers who have not checked in (step S23), and the number of counts is stored on the memory (step S24). Then, the processing shifts to step S30.

When it is recognized in step S20 to step S22 that there is a passenger who holds the ticket of this airline and has checked in, it is determined in step S25 whether the passenger is supposed to board the corresponding flight appearing on the current display screen or not. If it is determined that the passenger is supposed to board the flight, the processing shifts to step S26 and a number of passengers of the corresponding flight is counted up by one, then the number of counts is stored on the memory in step S27.

Then, the processing shifts to step S30. On the other hand, when it is determined in step S25 that the passenger belongs to some other flight, the processing shifts to step S28 and a number of passengers for other flights is counted up by one, then the number of counts is stored on the memory in step S29. Then, the processing shifts to step S30.

As described above, each number of counts for corresponding types (Ticket of this airline (Check-in:Done (Corresponding Flight/Other)/Check-in: Not yet)/Ticket of the other airlines) on one passenger can be obtained by operations in step S18, step S24, step S27, or in step S29. When it is recognized in step S30 that there is a passenger who has not yet been counted, the processing returns to step S16 once more, and the same processing is executed in step S17 to step S29. When the counting corresponding to each of the types on all the passengers recognized in step S15 is ended as described above (step S30), the processing shifts to step S31 (Refer to FIG. 6).

When it is clear from the contents stored on the memory that there is/are passenger/s who are not on board of the corresponding flight (step S31), the processing shifts to step S32 to display the corresponding areas in reverse video, and the processing shifts to the next step S33. The example of this reverse video for areas is shown in FIG. 2. Namely, as there are not-boarded passengers in the area "T1" in the example in FIG. 2, the area "T1" is displayed in reverse video. On the other hand, when there is no passenger who has not boarded the corresponding flight (step S31), the processing jumps to step S33.

The processing from step S14 to step S32 is related to the first area, and the processing in FIG. 5 and FIG. 6 is for all the areas, so that the same processing needs to be executed for the remaining areas. And for this reason, a number of areas is counted up by one in step S33, and when the processing to all the areas is recognized in step S34, processing shifts to step S35.

When it is detected in step S35 that "Read All" swith in the menu has been pressed, the information for the floors is updated in step S36. A touch panel is attached to the display unit with a touch panel 33, so that key entry for one of the divided areas can be made by pressing the respective area on the panel. Of the menu in FIG. 2, when, for example, "Read All" is pressed, successive reading of all the floors by the tag readers is started, and information can be read from all the floors.

For example, when the section shown as "Read Floor" of the menu in FIG. 2 is pressed, an instruction to successively read each tag is notified to the tag readers 4-1 to 4-n each located in each area obtained by dividing the third floor into T1 to T16 currently displayed. With this operations, each information can be read from the tags in all the areas.

Each of the tag readers 4-1 to 4-n generates waves to read each tag for a specified period of time to actuate a circuit of the tag-mounted boarding card, and reads information stored on the tag. The read information is checked to sort out the information for the corresponding flight number by the information processing unit 31, and areas in which there are not-boarded passengers of the corresponding flight number are displayed in reverse video on the display unit with a touch panel 33. In the example in FIG. 2, the areas T1, T8 and T11 are displayed in reverse video, which indicates that there are not-boarded passengers for the flight in the areas T1, T8 and T11.

Further, by pressing a required area section, only the particular area section can be searched. There is no need to check all the areas because it is clear that the areas in normal video have no not-boarded passengers, so that only the areas in reverse video are required to know, and the details of the areas can be checked by pressing those areas. Herein, when the area T11 (Refer to FIG. 2) in the reverse video is pressed, for example, a detailed screen for the area T11 appears. FIG. 3 shows an of example of the detailed screen.

A number of passengers having checked in as well as a number of passengers having not yet checked in within the selected area (area T11) can be displayed on this detailed screen for this airline and for the other airlines. In addition, all the details of the not-boarded passengers having checked in can be displayed, and the passengers of the corresponding flight are displayed in reverse video.

When it is decided in step S37 that updating of the floor information is completed in step S36, the processing returns to step S12. When key entry is detected before the update is ended (step S38), and if the entry key is "Next" or "Read Floor" in the menu (step S39), the screen is switched and the information for the corresponding floor displayed on the screen is updated (step S40). Then, the processing returns to step S12. While, if neither "Next" nor "Read Floor" in the menu is selected in step S39, the next processing is executed (step S41).

Description is made for the processing of "Read Floor" or "Read All" in the menu selected in step S13. Each of the processing is started in step S101 after step S13. At first, in step S101, it is determined whether a first area for the corresponding floor is displayed in reverse video or not. If it is determined that the first area is displayed in reverse video, the processing shifts to step S102, information stored on the memory is read out therein, and the information is displayed in step S121.

When it is determined that the first floor is displayed in normal video (step S101), at first, the tag reader 4-1 located in the first area is actuated (step S103). Then, a number of all the passengers having tag-mounted boarding cards in the first area is counted (step S104).

Where passengers holding the tickets of this airline are present is checked one by one from the tag information collected as described above (step S105). As a result, when a position of first passenger can not be recognized, the processing shifts to step S106, and the passenger is regarded as one of the passengers holding tickets of the other airlines to be counted by one, and the number of counts is stored on the memory in step S107. Then, the processing shifts to step S119.

On the other hand, when the first passenger can be recognized where he or she is in step S105, the passenger is added to a number of passengers holding the tickets of this airline and the number of counts is stored on the memory in the information processing unit 31 (step S108). Further, determination is made as to whether the passenger has checked in or not (step S109), and if it is determined that the passenger has checked in, he (she) is added to the number of passengers who have checked in (step S110), and the number of counts is stored on the memory (step Sill). Then, the processing shifts to step S114. When it can not be recognized in step S109 that the passenger has checked in, he (she) is added to the number of passengers who have not checked in (step S112), and the number of counts is stored on the memory (step S113). Then, the processing shifts to step S119.

When it is recognized in step S109 to step S111 that there is a passenger who holds the ticket of this airline and has checked in, it is determined in step S114 whether the passenger is supposed to board the corresponding flight appearing on the current display screen or not. If it is determined that the passenger is supposed to boord the fight, the processing shifts to step S115 and a number of passengers of the corresponding flight is counted up by one, then the number of counts is stored on the memory in step S116.

Then, the processing shifts to step S119. On the other hand, when it is determined in step S114 that the flight is not for the passenger, the processing shifts to step S117 and a number of passengers for other flights is counted up by one, then the number of counts is stored on the memory in step S118. Then, the processing shifts to step S119.

As described above, each number of counts for corresponding types (Ticket of this airline (Check-in:Done (Corresponding Flight/Other)/Check-in: Not yet)/Ticket of the other airlines) on one passenger can be obtained by operations in step S107, step S113, step S116, or in step S118. When it is recognized in step S119 that there is a passenger who has not yet been counted, the processing returns to step S105 once more, and the same processing is executed in step S106 to step S118. When the counting corresponding to each of the types on all the passengers recognized in step S104 is ended as described above (step S119), the processing shifts to step S120.

When it is clear from the contents stored on the memory that there is/are passenger/s who have not boarded the corresponding flight (step S120), the processing shifts to step S121 to display detailed information for the corresponding areas, and shifts to the next step S122. The example of this reverse video for areas is shown in FIG. 2. On the other hand, when there is no passenger who have not boarded the corresponding flight (step S120), the processing jumps to step S122. It is detected whether any key entry is made in step S122, and if it is detected that any entry from the menu is selected for instruction, the processing is executed correspondingly to the instructed contents (step S123).

As described above, with Embodiment 1, in the boarding processing system with a plurality of tag readers 4-1 to 4-n located in a plurality of areas into which a premises of airport is divided, if there is found a boarding card for which the check-in has been finished but the boarding is not confirmed in the check-in processing system, some or all the tag readers are actuated and in area in which that boarding card is positioned is determined according to the signal received the tag readers. With this operation, an area in which the boarding card is present can be determined, so that whereabouts of a not-boarded passenger can quickly and accurately be found out independently for each area.

In this boarding processing system, a plurality of areas are discretely displayed in reverse video on the display unit with a touch panel 33 respectively, so that whereabouts of each not-boarded passenger can easily be recognized.

A switch function for discretely displaying each result of determination for the plurality of areas is provided in the display unit with a touch panel 33, so that any required area can be specified with a switching operation. With this operation, a status of every not-boarded passenger can be recognized only from the required area (areas).

The switch of a display unit with a touch panel 33 is operated by touching it, so that the switching operation becomes easy. With this operation, every not-boarded passenger can quickly be followed.

When a plurality of tag readers are to be actuated, only a tag reader for the area operated by the switch among the plurality of areas is actuated, so that whereabouts of a boarding card can be recognized for an arbitrary area. With this operation, each not-boarded passenger can efficiently be followed.

When all the tag readers are actuated at the same time, the tag readers adjacent to each other may read the same information, so that a circuit for identifying the area from which information is received is required, but the tag readers are successively actuated for each area in Embodiment 1, so that there is no need to provide such a circuit because it is known which of the tag readers is first actuated at the time of actuation. In addition, the tag readers can be actuated one by one, so that a scale of a transmission circuit can be made smaller.

Although a preset order of actuating the tag readers has been employed in Embodiment 1, the present invention is not limited to the order, and like in Embodiment 2 described below, the actuating order of tag readers may be changed as required according to collection on actuation of tag readers for each area. It should be noted that Embodiment 2 has the same configuration as that of Embodiment 1, so that description thereof is omitted herein and the same reference numerals are assigned to the sections corresponding to those in Embodiment 1 for describing the operation.

After checking in, the place where passengers can go before boarding is limited. In Embodiment 1, as all the areas are successively read out, the result is accurate, however, it takes time to complete the reading. In order to perform the reading more efficiently, the order of tag readers stored in the reading-order storing section 31A is changed to the descending order of actuation from a tag reader with the largest number of not-boarded passengers therein, and the tag readers are actuated in this order.

The reading-order storing section 31a stores therein number of times when not-boarded passengers are detected to all the area numbers as well as date and time when the last detection is made, updates each information whenever it is read by each tag reader, changes the order based on the descending order from a tag reader with the largest number of times as well as based on the latest detected date for the tag readers having the same number of times, and stores therein the sorted order.

Figure 9:
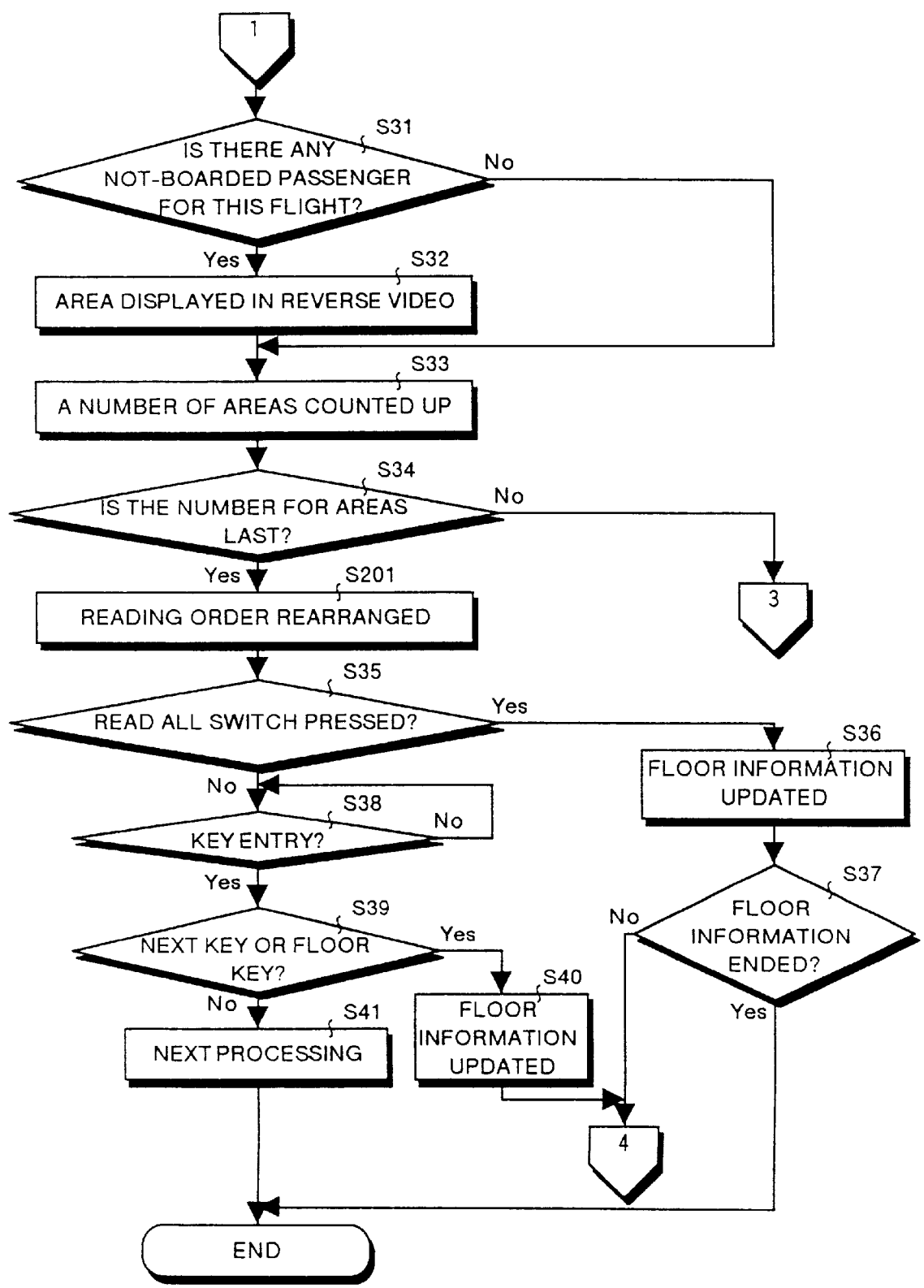
FIG. 9 is a flow chart for explaining a main operation according to Embodiment 2.

Next, description is made for only the sections different from those in Embodiment related to the operation. FIG. 9 is a flow chart for explaining a main operation according to Embodiment 2. Similarly to Embodiment 1, when it is clear from the contents stored on the memory that there are any passengers who are not on board of the corresponding flight (step S31), the processing shifts to step S32 to display the corresponding areas in reverse video, and shifts to the next step S33. A number of areas is counted by one in this step S33, and when the processing to all the areas is confirmed, the areas are sorted based on the reading order in step S201. Then, the processing shifts to step S35, and the same processing as that in Embodiment 1 is executed thereafter and on.

As described above, the information processing unit 31 executes reading according to the information in the reading-order storing section 31A set and stored therein in step S201 when an instruction of either "Read All" or "Read Floor" is received.

It should be noted that, if color display is used for a display screen, a section having high frequency of detection can be displayed by color-coding, so that, even when a particular area is manually retrieved, the retrieval can be carried out efficiently.

As described above, with Embodiment 2, the same effect as that in Embodiment 1 can be obtained, and in addition, the information processing unit 31 stores a number of incidences of remarked boarding cards for each of a plurality of areas on the memory, so that the stored data can be managed as data to objectively determine in which area not-boarded passengers tend to linger about.

The information processing unit actuates, when actuating tag readers, the tag readers in the descending order from a tag reader with the highest-incidence area according to the number of incidences stored on the memory, so that the efficiency of finding out a not-boarded passenger at an early stage can be improved.

Embodiment 3 described below intends, in addition to the functions in Embodiment 2, to enable automatic broadcasting of a message that there is not much time left to close the boarding to any area in which a not-boarded passenger for the corresponding flight exists by pressing "Broadcast to Specified Area" in the menu with the automatic broadcasting units 5 provided in each area. It should be noted that Embodiment 3 has the same configuration as that of Embodiment 1, so that description thereof is omitted herein and the same reference numerals are assigned to the sections corresponding to those in Embodiment 1 for describing the operation.

As for the operation, the processing next to the processing in step S41 in the flow chart of FIG. 6 and FIG. 9 as well as step S123 in the flow of FIG. 8 is regarded as the processing based on the pressing of "Broadcast to Specified Area" in the menu, and broadcasting to a required area can be realized by broadcasting to any area displayed in reverse video by pressing that key.

As described above, with Embodiment 3, the same effect as that in Embodiment 1 can be obtained, and in addition, the information processing unit 31 provides controls, when actuating the automatic broadcasting unit 5, for broadcasting targeted only to the area operated by a switch among the plurality of areas, so that broadcasting discretely to each area can be realized. With this operation, it is possible to solve such inconveniences as that the broadcasting does not easily reach or does not reach at all depending on the area.

The information processing unit 31 makes, when actuating the broadcasting unit, the unit broadcast to the areas in the descending order from the highest-incidence area according to the number of incidences stored on the memory, so that the message-transfer efficiency of finding out a not-boarded passenger at an early stage can be improved.

In addition, name information is stored in a tag, so that automatic broadcasting with a name in it can be made by using the name information.

Embodiment 4 described below intends, in addition to the functions in Embodiment 3, to enable automatic following or finding out of a not-boarded passenger. It should be noted that Embodiment 4 has the same configuration as that of Embodiment 1, so that description thereof is omitted herein and the same reference numerals are assigned to the sections corresponding to those in Embodiment 1 for describing the operation.

Information for a passenger whose check-in is completed is transferred from the information processing unit for checking-in 11 of the check-in counter 1 to the information processing unit 31 of the gate counter 3, while the passenger is entered in a list of not-boarded passenger and he (she) is kept in the list until the boarding card is inserted in the ticket reader 32. To board, a passenger inserts the ticket through the ticket reader 32 and passes through the gate, and at that point of time, the information for the passenger is transferred to the information processing unit 31 and the passengers name is deleted from the list of not-boarded passengers as the passenger who has boarded.

In this example, the key "All not-boarded passengers" is provided on the general view of the floor in FIG. 2 as well as on the menu screen in FIG. 3, the tag readers on all of the floors are actuated by pressing the key "All not-boarded passengers" on either of the display screens, and each current position of the not-boarded passengers of the corresponding flight on all of the floors is displayed.

Figure 10:
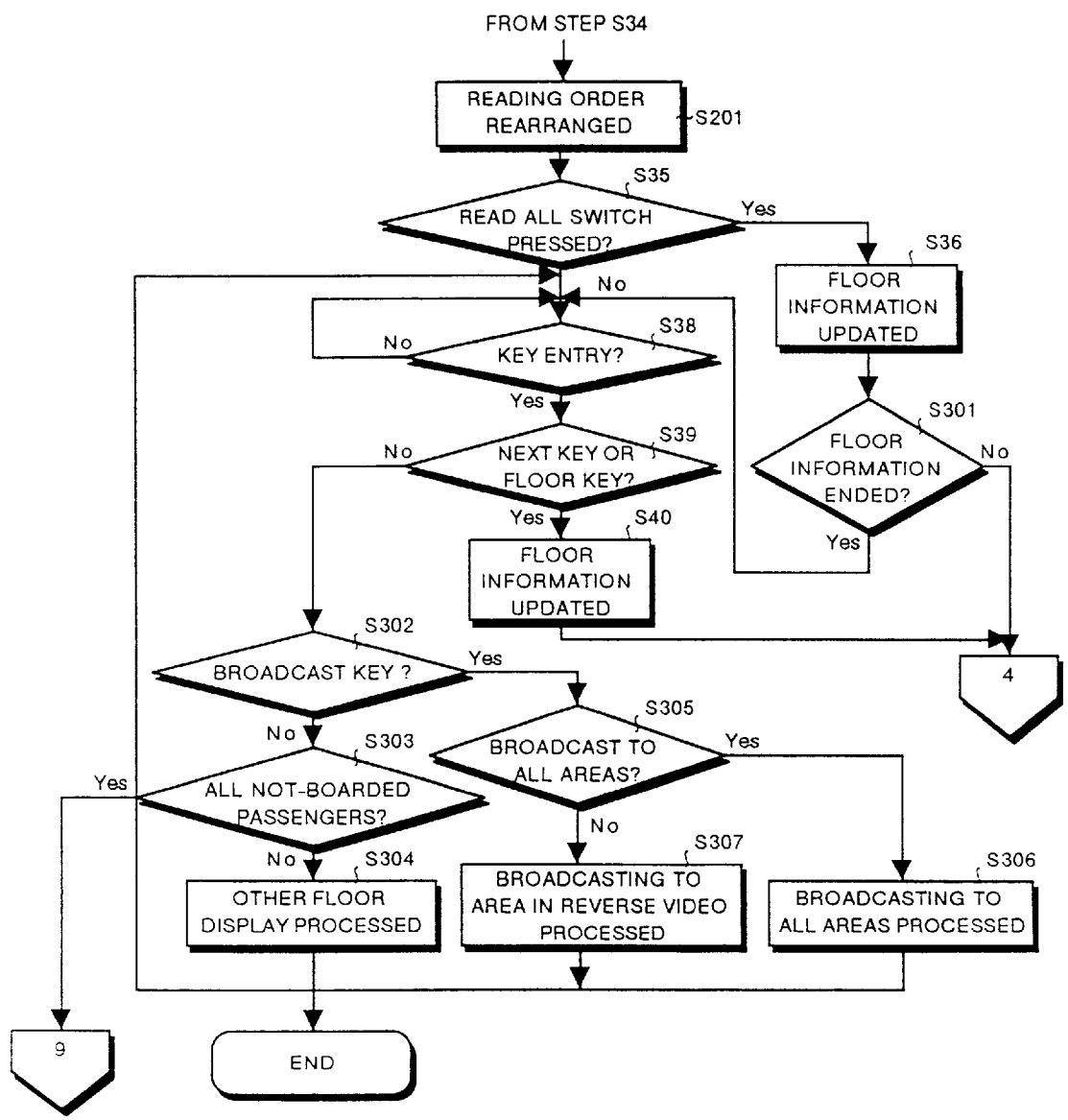
FIG. 10 is a flow chart for explaining a main operation when all the areas are selected according to Embodiment 4.

Description is made for a main operation of Embodiment 4. FIG. 10 is a flow chart for explaining a main operation when all the areas are selected according to Embodiment 4, FIG. 11 is a flow chart for explaining a main operation when one of the areas is selected, and FIG. 12 is a flow chart for explaining a main operation executed in common between selection of all the areas and selection of one of the areas.

In the detailed description made for broadcasting to a specified area according to Embodiment 3, when any key except "Next" and "Read Floor" in the menu is pressed as shown in FIG. 10, the processing shifts to step S302, and it is determined whether the pressed key is related to broadcasting or not. As a result, if it is determined that the key is not related to broadcasting, the processing shifts to step S303, and this time it is determined whether the key is "All not-boarded passengers" or not, and if it is determined that the key is "All not-boarded passengers", the processing shifts to step S501 in FIG. 12. On the other hand, when the key "All not-boarded passengers" can not be confirmed, the processing shifts to step S304 to display other floor, and the processing is ended.

When it is determined that the key is related to broadcasting and is "Broadcast to All" (step S305), the processing shifts to step S306, and boarding information or the like is broadcast to all the areas. Then, the processing returns to step S38. On the other hand, when it is determined that the key is not "Broadcast to All" but "Broadcast to Specified Area" (step S305), the processing shifts to step S307, and boarding information or the like is broadcast to a specified area in reverse video. Then the processing returns to step S38.

Figure 11:
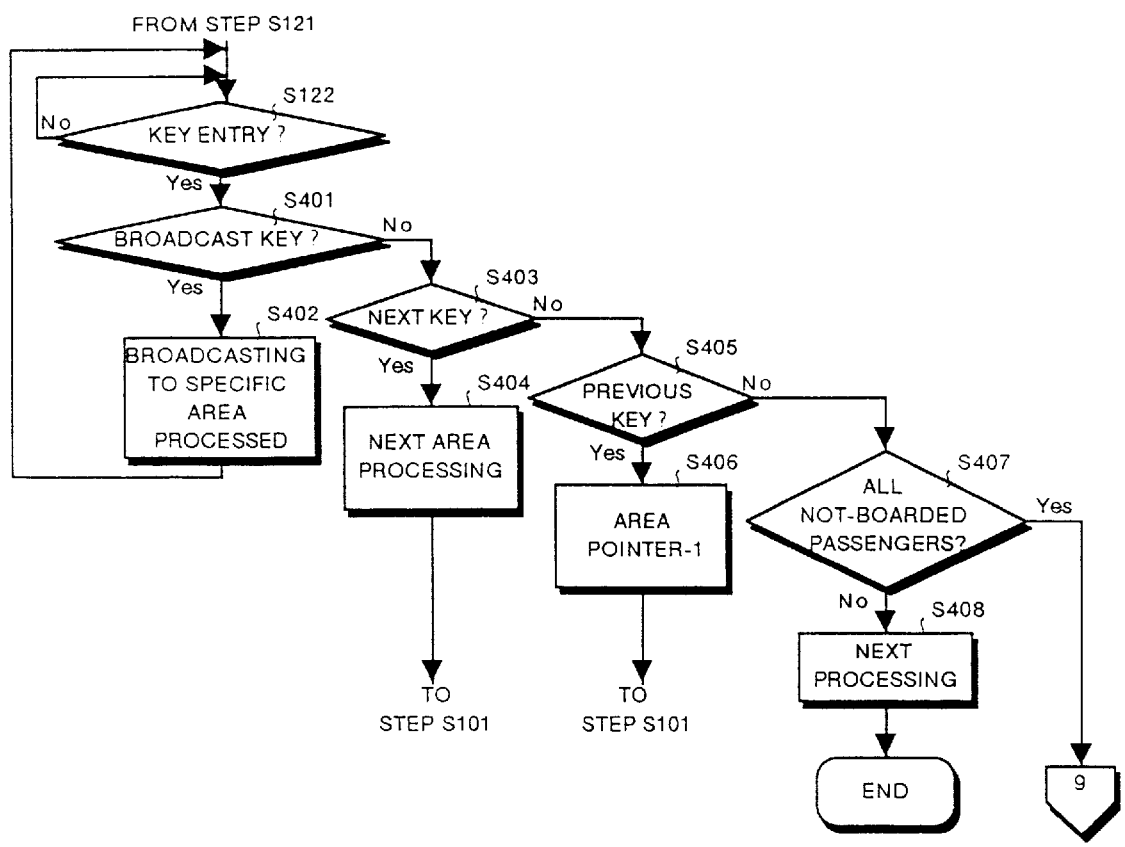
FIG. 11 is a flow chart for explaining a main operation when one of the areas is selected according to Embodiment 4.
Figure 12:
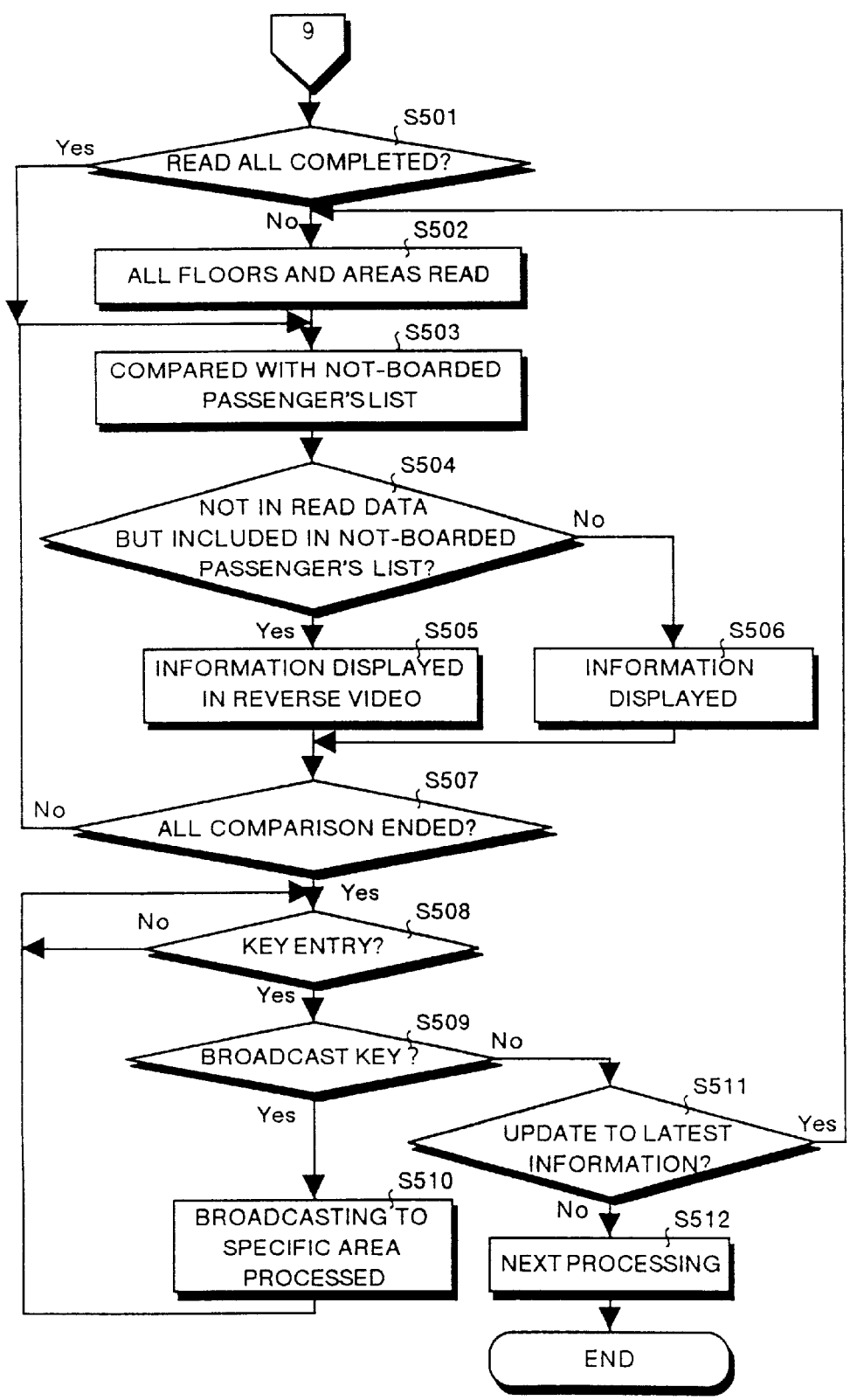
FIG. 12 is a flow chart for explaining a main operation executed in common between selection of all the areas and selection of one of the areas according to Embodiment 4.

Herein, to mention also about the operation when one of the areas is selected, as shown in FIG. 11, detailed information for not-boarded passengers is displayed (step S121 in FIG. 8), and then a state of waiting for key entry is effected in the processing (step S122). When key entry is detected in step S122 and if it is determined that the key is related to broadcasting (step S401), the processing shifts to step S402 and boarding information or the like is broadcast to the corresponding area. Then, the processing returns to step S122.

When the key related to broadcasting is not recognized in step S401 and "Next" key entry is recognized in step S403, the processing shifts to step S404, and processing for the next area is executed. Then the processing returns to step S101. When the key "Next" is not recognized in step S403 and "Previous" key entry is recognized in step S405, the processing shifts to step S406. In this step S406, an area pointer for the area is decremented by one, so that information for the immediately preceding area is displayed. Then, the processing returns to step S101.

When the "Next" key entry is not recognized in step S405 and "All not-boarded passengers" key entry is recognized in step S407, the processing shifts to step S501 in FIG. 12. On the other hand, when "All not-boarded passengers" key entry is not recognized, the processing shifts to step S408 and the next processing is executed. Then, the processing ends. This next processing is the same as that in step S302 to step S306 in FIG. 10.

Description is made for the processing in FIG. 12 from step S501. When processing for "Reading All" has already been completed in step S501, the processing shifts to step S503. When the processing for "Reading All" has not been completed, the processing shifts to step S502, reading of all the floors and areas is executed, and the processing shifts to step S503.

In step S305, verification is made between the list of not-boarded passengers stored in the information processing unit 31 and information for not-boarded passengers obtained from the areas on all the floors one by one. At that point of time, if it is found that there is a passenger who is on the list of not-boarded passenger but not in the passenger's information obtained by currently reading (step S504), the passenger is displayed in reverse video as one whose whereabouts is currently unknown (step S505) (Refer to FIG. 4). In this case, the whereabouts can repeatedly be checked by pressing the section displayed in reverse video until the current position is found out. On the other hand, when information for the passenger is obtained by this reading (step S504), which means that the passenger's boarding is not completed, the information is stored and is displayed in normal video in the same manner as that for other not-boarded passengers (step S506). As described above, the not-boarded passengers whose whereabouts are not known can be separated from those whose positions are confirmed for display.

Then, the processing shifts to step S507, but here, the processing is returned to step S503 until comparison is completed among all the passengers on the list of not-boarded passengers. When the comparison is completed in step S507, the processing shifts to step S508. Then, when key entry is recognized in step S508 and if the pressed key is related to broadcasting (step S509), broadcasting to a corresponding area is executed in the next step S510. Then, the processing returns to step S508.

When key entry for broadcasting is not recognized in step S509 and "Update to latest information" key entry is recognized in the next step S511, the processing returns to step S502 and the processing described above is executed. When "Update to latest information" key entry is not recognized in step S511, the processing shifts to step S512 and processing corresponding to the pressed key is executed. Then, the processing ends.

As described above, with Embodiment 4, the same effect as that in Embodiment 1 can be obtained, and in addition, the information processing unit 31 prepares a list of not-boarded passengers who have the boarding cards with which the check-in has been finished in the check-in counter 1 but the boarding is not confirmed, and finds out a current position of any not-boarded passenger on the list for each area according to a result of determination by each tag reader, so that management of whereabouts of the not-boarded passenger can be centralized.

Also, the information processing unit 31 updates the list at prespecified time intervals, so that each not-boarded passenger can be followed. With this operation, an uptodate information on whereabouts of the not-boarded passenger can be stored at any time.

In addition, in Embodiment 4, an ticket with a tag-mounted thereto can be issued even at the time of issuing an airline ticket, so that the equipment for the check-in counter 1 has the same configuration as that of the gate counter 3, which allows effective announcement to be made also to any passenger having not checked in.

Embodiments 1 to 4 have have applied to an airport, however, the present invention is not limited to the above applications, and is applicable to places such as a railway terminal stations, a port for a ferryboat, a theater or a baseball ground.

Although the present invention has been described with respect to specific embodiments for a complete and clear disclosure, the appended claims are not be thus limited but are to be construed as embodying all modifications and alternative constructions that may occur to one skilled in the art which fairly fail within the basic teaching herein set forth.

As described above, in a boarding processing system with a plurality of tag readers located in a plurality of areas into which a premises of an airport is divided, if there is found any remarked boarding card with which the check-in has been finished but the boarding has not been confirmed, the tag readers are actuated and an area among the plurality of areas in which the remarked boarding card is present is determined according to the signal received by the tag readers, so that remarked boarding cards for each area can be checked, an with this operation, whereabouts of not-boarded passengercan quickly and accurately be found out independently for each area.

With the present invention, in a boarding processing system, a plurality of areas are discretely displayed on a display unit respectively, so that whereabouts of each not-boarded passenger can easily be recognized.

With the present invention, a switch for discretely displaying each result of determination on the plurality of areas is provided in a display unit, so that any required area can be specified with a switching operation, and with this operation, it is possible to obtain a passenger management system in which a status of each not-boarded passenger can be recognized only from the required area.

With the present invention, a switch of the display unit is based on a touch panel, so that a switching operation becomes easy, an with this operation, it is possible to obtain a passenger management system in which each not-boarded passenger can quickly be followed.

With the present invention, when actuating a plurality of tag readers, only a tag reader for the area operated by a switch is actuated among the plurality of areas, so that whereabouts of remarked boarding cards can be recognized for an arbitrary area, an with this operation, it is possible to obtain a passenger management system in which each not-boarded passenger can efficiently be followed.

With the present invention, the information processing unit stores a number of incidences of remarked boarding cards for each of a plurality of areas on a memory, so that it is possible to obtain a passenger management system in which the stored data can be managed as data to objectively determine in which area not-boarded passengers tend to linger about.

With the present invention, the information processing unit actuates, when actuating tag readers, the tag readers in the descending order from a tag reader having the highest-incidence area according to a number of incidences stored on a memory, so that it is possible to obtain a passenger management system in which the efficiency of finding out each not-boarded passenger at an early stage can be improved.

With the present invention, the information processing unit provides controls, when actuating a broadcasting unit, for broadcasting targeted only to the area operated by a switch among a plurality of areas, so that broadcasting discretely to each area can be realized, an with this operation, it is possible to obtain a passenger management system which can solve such inconvenience that the broadcasting does not reach or does not easily reach depending on places.

With the present invention, the information processing unit makes, when actuating a broadcasting unit, the unit broadcast to the areas in the descending order from a highest-incidence area according to the number of incidences stored on the memory, so that it is possible to obtain a passenger management system in which the message-transfer efficiency of finding out each not-boarded passenger at an early stage can be improved.

With the present invention, the information processing unit prepares a list of not-boarded passengers who have remarked boarding cards with each of which the check-in has been finished in the check-in processing system but boarding has not been confirmed, and finds out a current position of any not-boarded passenger on the list for each area according to a result of determination by each tag reader, so that it is possible to obtain a passenger management system in which management of whereabouts of each not-boarded passenger can be centralized.

With the present invention, the information processing unit updates the list at prespecified time intervals, so that each not-boarded passenger can be followed, and with this operation, it is possible to obtain a passenger management system in which an update of whereabouts of each not-boarded passenger can be stored at any time.

With the present invention, in the boarding processing system with a plurality of tag readers located in a plurality of areas into which a premises of an airport is divided, the tag readers are actuated if there is found any remarked boarding card which has been issued but with which boarding has not been confirmed, and in which area among the plurality of areas the remarked boarding card is present is determined according to the signal received by the tag readers, so that remarked boarding cards can be checked for each area, an with this operation, it is possible to obtain a passenger management system in which whereabouts of not-boarded passenger can quickly and accurately be found out independently for each area.

This application is based on Japanese patent application No. HEI 10-173138 filed in the Japanese Patent Office on Jun. 19, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A passenger management system for managing movement of passengers by using a boarding card having a tag recorded therein information on boarding of the passenger provided thereon; said system comprising:
   a check-in processing system for issuing said boarding card and performing checking-in processing; and
   a boarding processing system for confirming boarding of passengers using said boarding card; wherein said boarding processing system comprises:
   a plurality of tag readers, located in a plurality of discrete areas into which premises of an airport is divided, for receiving a signal which contains information on boarding of the passenger transmitted from the tag provided on said boarding card; and
   an information processing unit for actuating said tag readers, if there is found a remarked boarding card with which the check-in has been finished but boarding has not been confirmed, and determining an area among said plurality of areas in which said remarked boarding card is present based on the signal received by said tag readers,
   wherein said information processing unit prepares a list of not-boarded passengers who have said remarked boarding cards with which check-in has been finished in said check-in processing system but boarding has not been confirmed, and finds out current position of a not-boarded passenger on said list for each area according to a result of determination by each of said tag readers.

2. A passenger management system according to claim 1; wherein said boarding processing system has a display unit for discretely displaying thereon said plurality of areas.

3. A passenger management system according to claim 1; wherein said information processing unit has a memory for storing thereon a number of incidences of said remarked boarding cards for each of said plurality of areas.

4. A passenger management system according to claim 1; wherein said boarding processing system has a broadcasting unit for broadcasting voice discretely to each of said areas, and said information processing unit provides controls, when actuating said broadcasting unit, for broadcasting targeted only to the area among said plurality of areas for which said switch is operated.

5. A passenger management system according to claim 3; wherein said information processing unit actuates said tag readers in the descending order from a tag reader having a highest-incidence area according to the number of incidences stored on said memory.

6. A passenger management system according to claim 4; wherein said information processing unit makes, when actuating said broadcasting unit, the unit broadcast to the areas in the descending order from the highest-incidence area according to the number of incidences stored on said memory.

7. A passenger management system according to claim 5; wherein said information processing unit updates said list at prespecified time intervals.

8. A passenger management system according to claim 2; wherein said display unit has a switch for discretely displaying the result of determination for said plurality of areas.

9. A passenger management system according to claim 2; wherein said information processing unit has a memory for storing thereon a number of incidences of said remarked boarding cards for each of said plurality of areas.

10. A passenger management system according to claim 2: wherein said boarding processing system has a broadcasting unit for broadcasting voice discretely to each of said areas, and said information processing unit provides controls, when actuating said broadcasting unit, for broadcasting targeted only to the area among said plurality of areas for which said switch is operated.

11. A passenger management system according to claim 2; wherein said information processing unit prepares a list of not-boarded passengers who have said remarked boarding cards with which check-in has been finished in said check-in processing system but boarding has not been confirmed, and finds out current position of a not-boarded passenger on said list for each area according to a result of determination by each of said tag readers.

12. A passenger management system according to claim 10; wherein said information processing unit actuates said tag readers in the descending order from a tag reader having a highest-incidence area according to the number of incidences stored on said memory.

13. A passenger management system according to claim 11; wherein said information processing unit makes, when actuating said broadcasting unit, the unit broadcast to the areas in the descending order from the highest-incidence area according to the number of incidences stored on said memory.

14. A passenger management system according to claim 12; wherein said information processing unit updates said list at prespecified time intervals.

15. A passenger management system according to claim 9; wherein said display unit has said switch based on a touch panel.

16. A passenger management system according to claim 9; wherein said information processing unit actuates, when actuating said plurality of tag readers, only the tag reader in the area among said plurality of areas for which said switch is operated.

17. A passenger management system according to claim 14; wherein said information processing unit actuates, when actuating said plurality of tag readers, only the tag reader in the area among said plurality of areas for which said switch is operated.

* * * * *